US012650162B2

(12) United States Patent
Takagi et al.

(10) Patent No.: US 12,650,162 B2
(45) Date of Patent: Jun. 9, 2026

(54) WAVE REDUCER, INDUSTRIAL MACHINE, DRIVE SYSTEM, AND CORRECTION METHOD

(71) Applicant: NIDEC DRIVE TECHNOLOGY CORPORATION, Muko (JP)

(72) Inventors: Daisuke Takagi, Muko (JP); Seidai Ueda, Muko (JP)

(73) Assignee: Nidec Drive Technology Corp., Kyoto (JP)

( * ) Notice: Subject to any disclaimer, the term of this patent is extended or adjusted under 35 U.S.C. 154(b) by 0 days.

(21) Appl. No.: 18/813,253

(22) Filed: Aug. 23, 2024

(65) Prior Publication Data

US 2025/0075786 A1     Mar. 6, 2025

(30) Foreign Application Priority Data

Aug. 29, 2023     (JP) ................................. 2023-138717

(51) Int. Cl.
  F16H 49/00      (2006.01)
  B25J 9/10      (2006.01)
(52) U.S. Cl.
  CPC .......... F16H 49/001 (2013.01); B25J 9/1025 (2013.01); F16H 2049/003 (2013.01)

(58) Field of Classification Search
  CPC .. F16H 49/001; F16H 2049/003; B25J 9/1025
  See application file for complete search history.

(56) References Cited

U.S. PATENT DOCUMENTS

2004/0079174 A1     4/2004  Horiuchi
2025/0055391 A1*    2/2025  Takagi ................... B25J 9/1674

FOREIGN PATENT DOCUMENTS

JP          2004198400 A     7/2004
JP          2020186915 A     11/2020
WO      WO-2020149204 A1 *  7/2020  .............. B25J 19/02

* cited by examiner

*Primary Examiner* — Terence Boes
(74) *Attorney, Agent, or Firm* — Keating & Bennett, LLP

(57)                ABSTRACT

A wave reducer includes a cam, a flex gear, an internal gear, an angle sensor, a thrust sensor, and a circuit. The angle sensor is located in the flex gear and an output value thereof changes in accordance with a rotation angle of the cam. The thrust sensor is located in the flex gear and an output value thereof changes according to a thrust force applied to the cam. The circuit is electrically connected with the angle sensor and the thrust sensor. The circuit corrects an output value of the angle sensor based on an output value of the thrust sensor.

16 Claims, 9 Drawing Sheets

WAVE REDUCER, INDUSTRIAL MACHINE, DRIVE SYSTEM, AND CORRECTION METHOD

CROSS-REFERENCE TO RELATED APPLICATIONS

The present application claims priority under 35 U.S.C. § 119 to Japanese Patent Application No. 2023-138717, filed on Aug. 29, 2023, the entire contents of which are incorporated herein by reference.

1. FIELD OF THE INVENTION

The present disclosure relates to wave reducers, industrial machines, drive systems, and correction methods.

2. BACKGROUND

There is a known reducer including a detection device having a plurality of strain gauges.

In this type of reducer, an angle sensor can be configured using a plurality of strain gauges. In that case, two sets of bridge circuits are configured by the plurality of strain gauges. The output values of the two sets of bridge circuits having a sinusoidal shape. The two sets of bridge circuits are arranged so as to have a phase difference of about ¼ cycle from each other. The angle sensor detects the rotation angle of a rotational motion input to the reducer based on the output values of the two sets of bridge circuits.

The amplitude of the output values of the bridge circuits is substantially constant. However, when a force acts from an input side of the reducer as in acceleration of a motor, or when an external force acts from an output side of the reducer, the amplitude of the output value of the bridge circuit slightly changes due to the thrust force applied to a cam of the reducer. Specifically, when a force acts from the input side of the reducer, the amplitude of the output value of the bridge circuit slightly decreases. When a force acts from the output side of the reducer, the amplitude of the output value of the bridge circuit slightly increases. Due to this, an error occurs in the detection value of the angle sensor.

SUMMARY

An example embodiment of the present application provides a wave reducer including a cam including a non-circular outer surface, a flex gear flexurally deformable by rotation of the cam, an internal gear meshing with the flex gear, an angle sensor located in the flex gear and having an output value that is variable in accordance with a rotation angle of the cam, a thrust sensor located in the flex gear and having an output value that is variable in accordance with a thrust force applied to the cam, and a circuit electrically connected to the angle sensor and the thrust sensor. The circuit is operable to correct an output value of the angle sensor based on an output value of the thrust sensor.

Another example embodiment of the present application provides a drive system including a wave reducer and a circuit. The wave reducer includes a cam including a non-circular outer surface, a flex gear flexurally deformable by rotation of the cam, an internal gear meshing with the flex gear, an angle sensor located in the flex gear and having an output value that is variable in accordance with a rotation angle of the cam, and a thrust sensor located in the flex gear and having an output value that is variable in accordance with a thrust force applied to the cam, and the circuit is operable to correct an output value of the angle sensor based on an output value of the thrust sensor.

A further example embodiment of the present application provides a correction method of correcting an output value of an angle sensor in a wave reducer including a cam including a non-circular outer surface, a flex gear flexurally deformable by rotation of the cam, an internal gear meshing with the flex gear, the angle sensor located in the flex gear, the angle sensor having an output value that is variable in accordance with a rotation angle of the cam, and a thrust sensor located in the flex gear and having an output value that is variable in accordance with a thrust force applied to the cam, the correction method including correcting the output value of the angle sensor based on an output value of the thrust sensor.

Another example embodiment of the present application provides a wave reducer including a cam including a non-circular outer surface, a flex gear flexurally deformable by rotation of the cam, an internal gear meshing with the flex gear, an angle sensor located in the flex gear and having an output value that is variable in accordance with a rotation angle of the cam, and a circuit electrically connected to the angle sensor. The angle sensor includes two sets of bridge circuits including a plurality of strain gauges, output values of the two sets of bridge circuits have a phase difference of about ¼ cycle, and the circuit is operable to correct output values of the two sets of bridge circuits so as to cause a sum of squares of the output values of the two sets of bridge circuits to be equal or approximately equal to a constant value.

An additional example embodiment of the present application provides a drive system including a wave reducer and a circuit. The wave reducer includes a cam including a non-circular outer surface, a flex gear flexurally deformable by rotation of the cam, an internal gear meshing with the flex gear, and an angle sensor located in the flex gear and having an output value that is variable in accordance with a rotation angle of the cam, and the angle sensor includes two sets of bridge circuits including a plurality of strain gauges, output values of the two sets of bridge circuits have a phase difference of about ¼ cycle, and the circuit is operable to correct output values of the two sets of bridge circuits so as to cause a sum of squares of the output values of the two sets of bridge circuits to be equal or approximately equal to a constant value.

Yet another example embodiment of the present application provides a correction method of correcting an output value of an angle sensor in a wave reducer including a cam including a non-circular outer surface, a flex gear flexurally deformable by rotation of the cam, an internal gear meshing with the flex gear, and an angle sensor located in the flex gear and having an output value that is variable in accordance with a rotation angle of the cam. The angle sensor includes two sets of bridge circuits including a plurality of strain gauges, output values of the two sets of bridge circuits have a phase difference of about ¼ cycle, and the circuit is operable to correct output values of the two sets of bridge circuits so as to cause a sum of squares of the output values of the two sets of bridge circuits to be equal or approximately equal to a constant value.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present application will be described with reference to the drawings.

Figure 1:
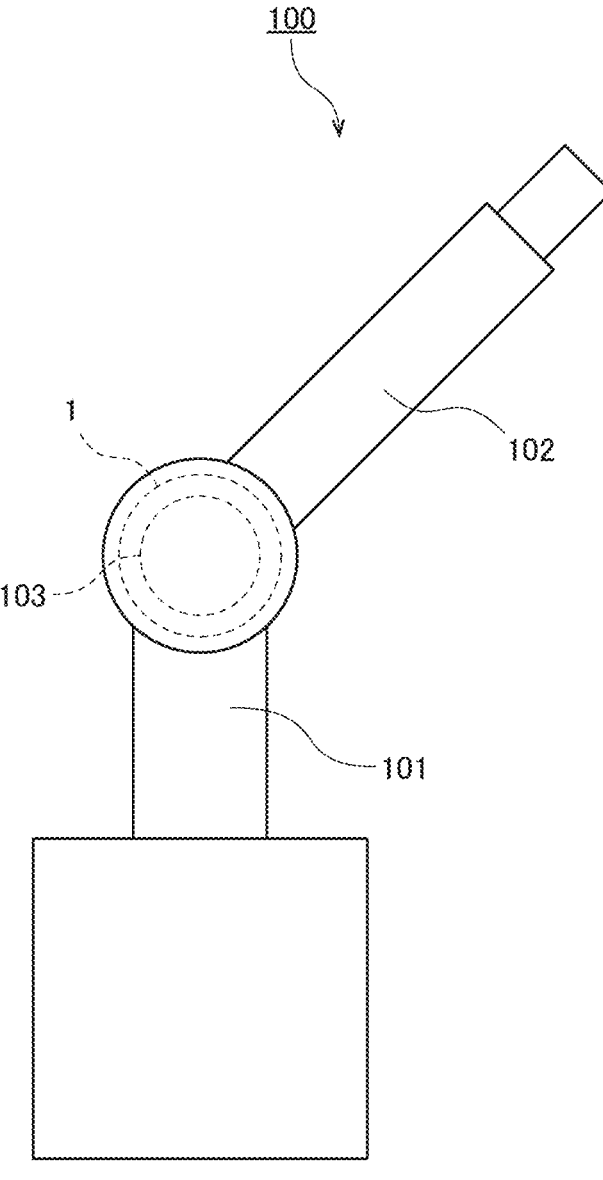
FIG. 1 is a schematic view of an industrial machine according to an example embodiment of the present disclosure.

FIG. 1 is a schematic view of an industrial machine 100 including a wave reducer 1 according to one example embodiment. The industrial machine 100 is a so-called industrial robot that performs work such as conveyance, processing, and assembly of components in a manufacturing line of an industrial product, for example. As illustrated in FIG. 1, the industrial machine 100 includes a base frame 101, an arm 102, a motor 103, and the wave reducer 1.

The arm 102 is pivotally supported with respect to the base frame 101. The motor 103 and the wave reducer 1 are incorporated in a joint between the base frame 101 and the arm 102. When the motor 103 is supplied with a drive current, rotational motion is output from the motor 103. The wave reducer 1 decelerates and transmits, to the arm 102, the rotational motion output from the motor 103. Due to this, the arm 102 pivots with respect to the base frame 101 at a speed after deceleration.

Subsequently, a detailed structure of the wave reducer 1 will be described.

Hereinafter, a direction parallel to a central axis 9 of the wave reducer 1 is called "axial", a direction orthogonal to the central axis 9 of the wave reducer 1 is called "radial", and a direction along an arc about the central axis 9 of the wave reducer 1 is called "circumferential". Note, however, the "parallel" described above includes substantially parallel. The "orthogonal" described above also includes substantially orthogonal.

Figure 2:
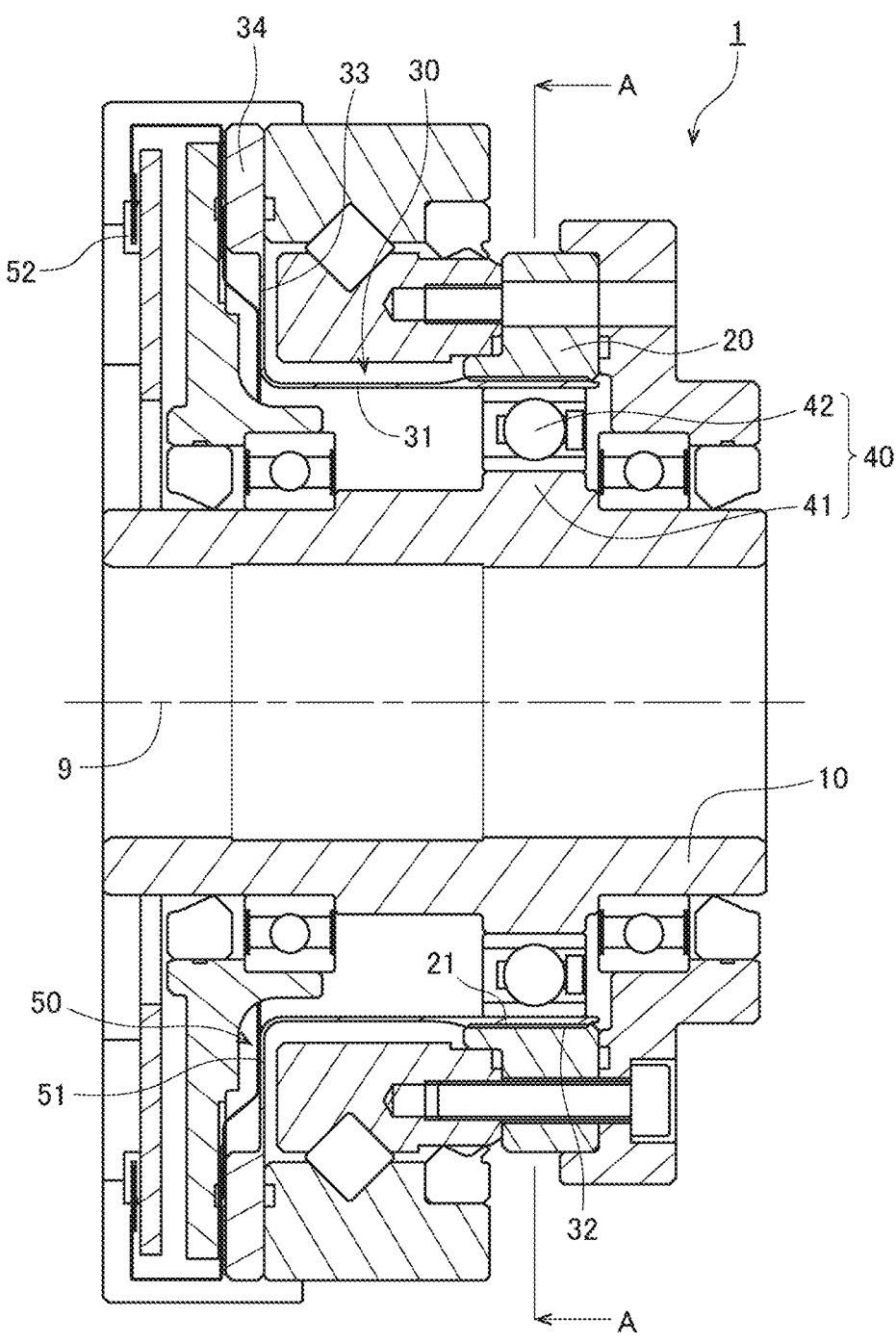
FIG. 2 is a longitudinal cross-sectional view of a reducer according to an example embodiment of the present disclosure.
Figure 3:
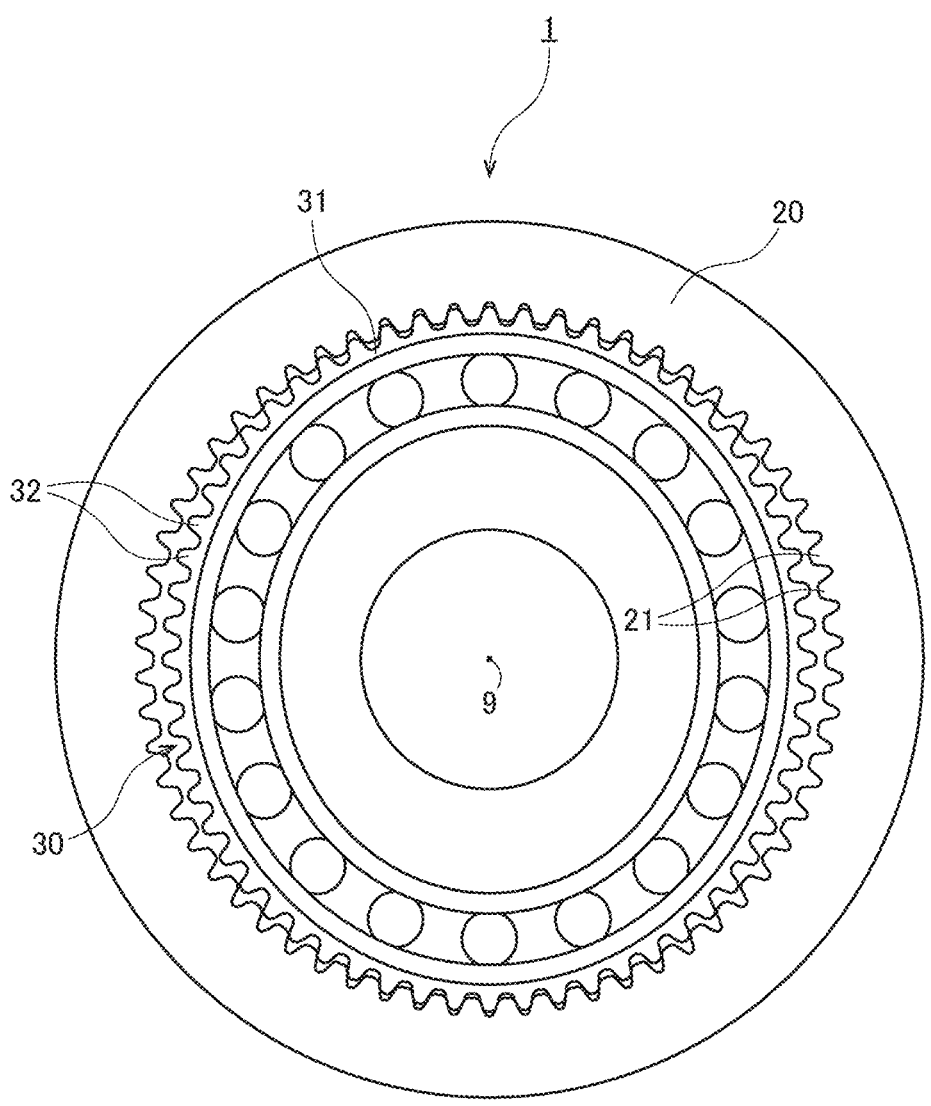
FIG. 3 is a transverse cross-sectional view of the reducer.

FIG. 2 is a longitudinal cross-sectional view of the wave reducer 1 according to one example embodiment. FIG. 3 is a transverse cross-sectional view of the wave reducer 1 viewed from A-A position in FIG. 2. To avoid complication of the drawings, hatching that indicates a cross section is not shown in FIG. 3.

The wave reducer 1 is a device that decelerates the rotational motion at a first rotational speed output from the motor 103 to a second rotational speed slower than the first rotational speed. As illustrated in FIGS. 2 and 3, the wave reducer 1 includes an input shaft 10, an internal gear 20, a flex gear 30, and a wave generator 40.

The input shaft 10 is a member that rotates at the first rotational speed before deceleration. The input shaft 10 is connected to an output shaft of the motor 103. The input shaft 10 extends in the axial direction along the central axis 9. The input shaft 10 of the present example embodiment has a cylindrical shape about the central axis 9. The input shaft 10 axially penetrates the wave reducer 1. The input shaft 10 may be the same member as the output shaft of the motor 103.

The internal gear 20 is a gear that meshes with the flex gear 30. The internal gear 20 rotates at the second rotational speed lower than the first rotational speed along with the rotation of the input shaft 10. The internal gear 20 is fixed to the arm 102. The internal gear 20 is disposed radially outside external teeth 32 described later. Rigidity of the internal gear 20 is sufficiently higher than rigidity of a body 31 described later of the flex gear 30.

The internal gear 20 has a circular shape centered on the central axis 9. The internal gear 20 has a plurality of internal teeth 21. The plurality of internal teeth 21 protrude radially inward from an inner peripheral surface of the internal gear 20. The plurality of internal teeth 21 are arrayed at a constant pitch in the circumferential direction on the inner peripheral surface of the internal gear 20.

The flex gear 30 is a gear flexurally deformed due to rotation of a cam 41 described later. The flex gear 30 is fixed to the base frame 101. As illustrated in FIGS. 2 and 3, the flex gear 30 includes a body 31, a plurality of external teeth 32, a diaphragm 33, and a thick part 34.

The body 31 is a tubular part centered on the central axis 9. An axial one end of the body 31 is connected to the diaphragm 33. The body 31 extends from a radial inner end part of the diaphragm 33 toward the axial other side. The end part on the axial other side of the body 31 is positioned radially outside the wave generator 40 and radially inside the internal gear 20. Since the body 31 has flexibility, it can be flexurally deformed in the radial direction.

The plurality of external teeth 32 protrude radially outward from the radial outer surface of the body 31. The plurality of external teeth 32 are arranged on the radial outer surface of the axial other end of the body 31. The plurality of external teeth 32 are arrayed at a constant pitch in the circumferential direction. Some of the plurality of external teeth 32 and some the plurality of internal teeth 21 described above mesh with each other. The number of the internal teeth 21 of the internal gear 20 is slightly different from the number of the external teeth 32 of the flex gear 30.

The diaphragm 33 surrounds the central axis 9 and expands in a direction intersecting the central axis 9. The diaphragm 33 preferably extends along a plane orthogonal to the central axis 9. The diaphragm 33 expands radially outward from an axial one end of the body 31. The diaphragm 33 has an annular shape surrounding the central axis 9. Since the diaphragm 33 is thin, it can be slightly flexurally deformed.

The thick part 34 is a circular part positioned radially outside the diaphragm 33. The axial thickness of the thick part 34 is larger than the axial thickness of the diaphragm 33. The thick part 34 is fixed to the base frame 101 directly or via another member.

The wave generator 40 is a mechanism that generates periodic flexural deformation in the flex gear 30. The wave generator 40 is disposed radially inside the external teeth 32. The wave generator 40 includes the cam 41 and a flexible bearing 42. In the present example embodiment, the input shaft 10 and the cam 41 are formed of a single component. However, the cam 41 may be a separate component from the input shaft 10. In that case, the cam 41 may be fixed to the input shaft 10. The cam 41 is a component that gives the flex gear 30 displacement with a period of 180°. The cam 41 has a non-circular outer surface. The cam 41 of the present example embodiment has an elliptical outer surface about the central axis 9.

The flexible bearing 42 is a flexurally deformable bearing. The flexible bearing 42 is disposed between the radial outer surface of the cam 41 and the radial inner surface of the body 31 of the flex gear 30.

An inner ring of the flexible bearing 42 comes into contact with the radial outer surface of the cam 41. An outer ring of the flexible bearing 42 comes into contact with the radial inner surface of the body 31. Therefore, the body 31 is deformed into an elliptical shape along the radial outer surface of the cam 41. As a result, the external teeth 32 of the flex gear 30 and the internal teeth 21 of the internal gear 20 mesh with each other at two locations corresponding to both ends of the major axis of the ellipse. At other positions in the circumferential direction, the external teeth 32 and the internal teeth 21 do not mesh with each other.

When the motor 103 is driven, together with the input shaft 10, the cam 41 rotates at the first rotational speed about the central axis 9. Due to this, the major axis of the ellipse of the flex gear 30 also rotates at the first rotational speed. Then, the meshing position between the external teeth 32 and the internal teeth 21 also changes at the first rotational speed in the circumferential direction. As described above, the number of the internal teeth 21 of the internal gear 20 is slightly different from the number of the external teeth 32 of the flex gear 30. Due to this difference in the number of teeth, the meshing position between the external teeth 32 and the internal teeth 21 slightly changes in the circumferential direction every rotation of the cam 41. As a result, the internal gear 20 rotates about the central axis 9 with respect to the flex gear 30 at the second rotational speed slower than the first rotational speed.

The wave reducer 1 includes a sensor 50. As illustrated in FIG. 2, the sensor 50 includes a sensor substrate 51. The sensor substrate 51 is fixed to the surface of the diaphragm 33.

Figure 4:
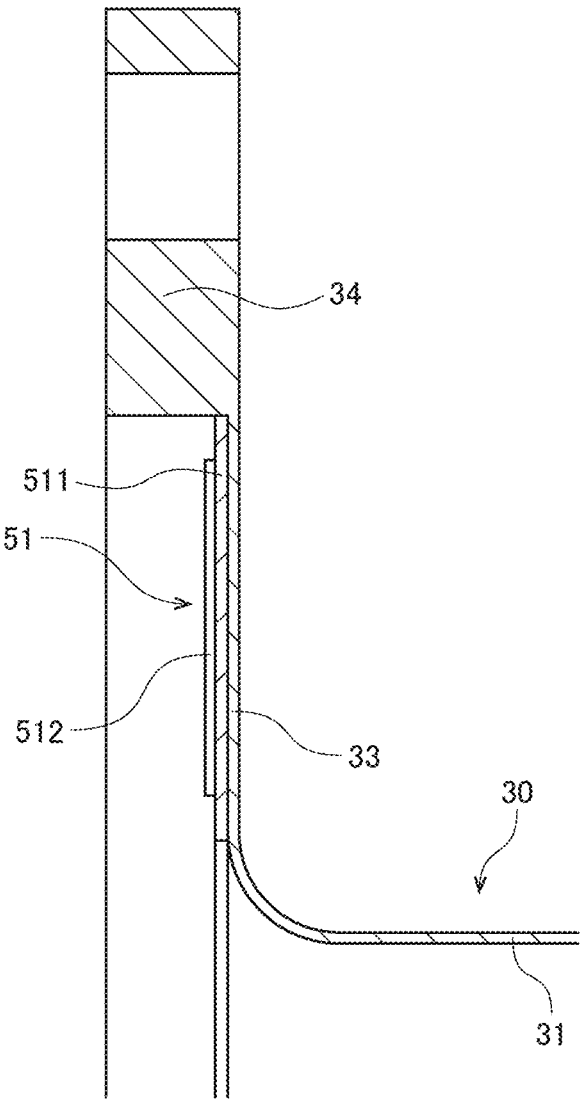
FIG. 4 is a partial longitudinal cross-sectional view of a flex gear near a sensor substrate according to an example embodiment of the present disclosure.
Figure 5:
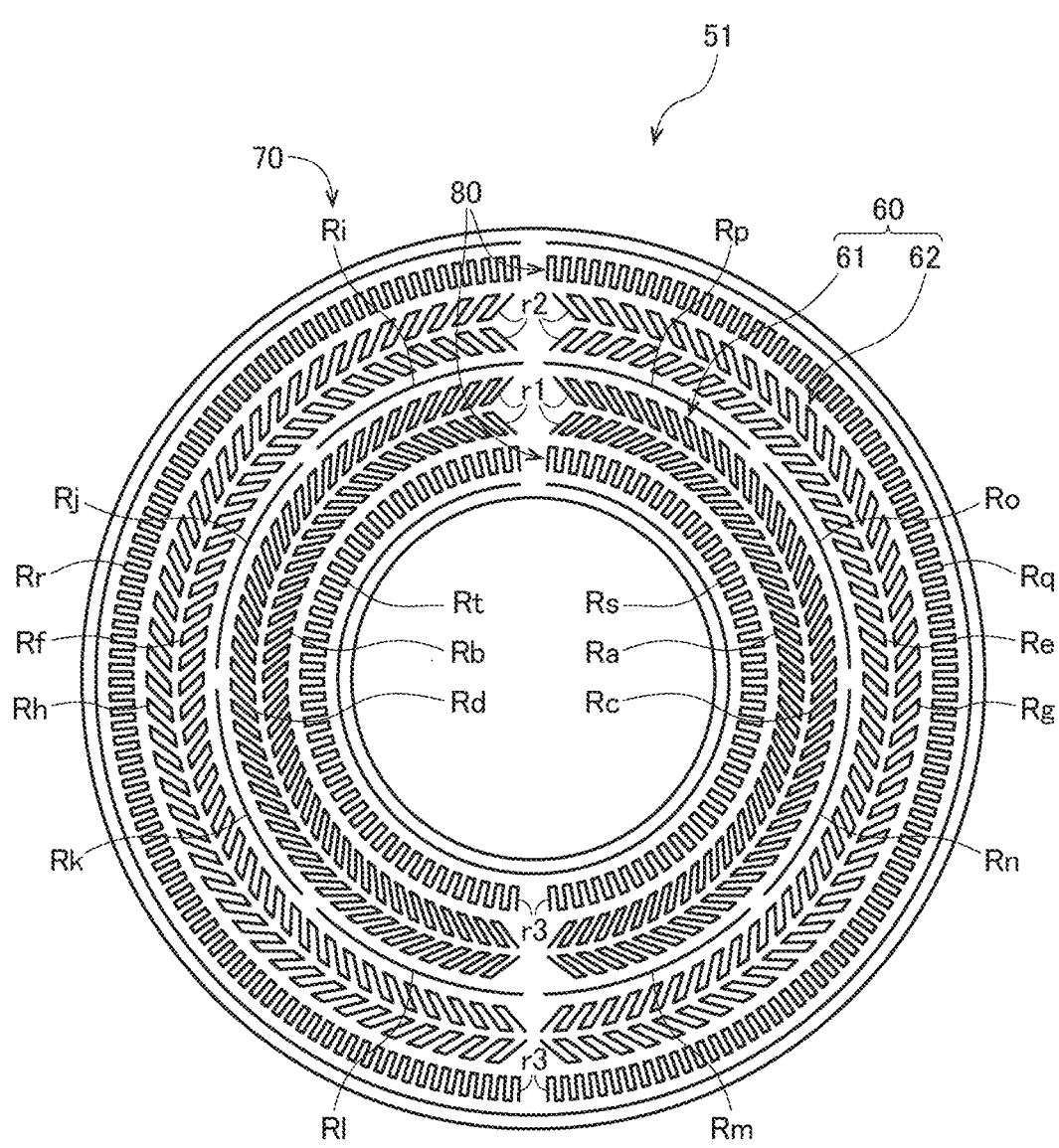
FIG. 5 is a plan view of the sensor substrate.

FIG. 4 is a partial longitudinal cross-sectional view of the flex gear 30 near the sensor substrate 51. FIG. 5 is a plan view of the sensor substrate 51. As illustrated in FIG. 4, the sensor substrate 51 includes an insulation layer 511 and a conductor layer 512.

The insulation layer 511 is flexibly deformable. The insulation layer 511 expands in a direction intersecting the central axis 9. The insulation layer 511 has a circular shape about the central axis 9. The insulation layer 511 is made of an insulator resin or an inorganic insulating material. The insulation layer 511 is disposed on the surface of the diaphragm 33. The conductor layer 512 is formed on the surface of the insulation layer 511. As a material of the conductor layer 512, a conductor metal is used. As a material of the conductor layer 512, for example, a copper alloy, a chromium alloy, or copper is used.

The conductor layer 512 includes a torque sensor 60, an angle sensor 70, and a thrust sensor 80. Each of the torque sensor 60, the angle sensor 70, and the thrust sensor 80 includes a strain gauge. As illustrated in FIG. 2, the sensor 50 includes a circuit 52. The circuit 52 is electrically connected to the torque sensor 60, the angle sensor 70, and the thrust sensor 80.

The torque sensor 60 is a sensor for detecting torque applied to the diaphragm 33 of the flex gear 30. That is, the torque sensor 60 is a sensor having an output value that is variable in accordance with the torque applied to the flex gear 30. As illustrated in FIG. 5, the torque sensor 60 of the present example embodiment includes a first torque sensor 61 and a second torque sensor 62. The second torque sensor 62 is disposed radially outward relative to the first torque sensor 61.

The first torque sensor 61 includes four strain gauges Ra, Rb, Rc, and Rd. Among the four strain gauges Ra, Rb, Rc, and Rd, the two strain gauges Ra and Rb are arranged at intervals in the circumferential direction. The two strain gauges Ra and Rb are each provided in a semicircular arc shape in a range of about 180° centered on the central axis 9. The radial distance from the central axis 9 to the strain gauge Ra and the radial distance from the central axis 9 to the strain gauge Rb are substantially the same.

Among the four strain gauges Ra, Rb, Rc, and Rd, the other two strain gauges Rc and Rd are arranged radially outside relative to the two strain gauges Ra and Rb. The two strain gauges Rc and Rd are arranged at intervals in the circumferential direction. The two strain gauges Rc and Rd are each provided in a semicircular arc shape in a range of about 180° centered on the central axis 9. The radial distance from the central axis 9 to the strain gauge Rc and the radial distance from the central axis 9 to the strain gauge Rd are substantially the same.

The two strain gauges Ra and Rc and the two strain gauges Rb and Rd are arranged concentrically and line-symmetrically.

As illustrated in FIG. 5, each of the strain gauges Ra, Rb, Rc, and Rd has a pattern circumferentially extending while being bent in a zigzag manner. Each of the strain gauges Ra, Rb, Rc, and Rd has a plurality of resistance lines r1 circumferentially arrayed and substantially parallel to one another. Each of the resistance lines r1 extends in a direction having both radial and circumferential components.

The resistance lines r1 of the strain gauges Ra and Rd are inclined to a circumferential one side with respect to the radial direction. The resistance lines r1 of the strain gauges Rb and Rc are inclined to the circumferential other side with respect to the radial direction. The inclination angle of the resistance line r1 with respect to the radial direction is, for example, 45°. The end parts of the resistance lines r1 circumferentially adjacent to each other are alternately connected radially inside or radially outside. Due to this, the plurality of resistance lines r1 are connected in series as a whole.

The second torque sensor 62 includes four strain gauges Re, Rf, Rg, and Rh. Among the four strain gauges Re, Rf, Rg, and Rh, the two strain gauges Re and Rf are arranged at intervals in the circumferential direction. The two strain gauges Re and Rf are each provided in a semicircular arc shape in a range of about 180° centered on the central axis 9. The radial distance from the central axis 9 to the strain gauge Re and the radial distance from the central axis 9 to the strain gauge Rf are substantially the same.

Among the four strain gauges Re, Rf, Rg, and Rh, the other two strain gauges Rg and Rh are disposed radially outside relative to the two strain gauges Re and Rf. The two strain gauges Rg and Rh are arranged at intervals in the circumferential direction. The two strain gauges Rg and Rh are each provided in a semicircular arc shape in a range of about 180° centered on the central axis 9. The radial distance from the central axis 9 to the strain gauge Rg and the radial distance from the central axis 9 to the strain gauge Rh are substantially the same.

The two strain gauges Re and Rg and the two strain gauges Rf and Rh are arranged concentrically and line-symmetrically.

As illustrated in FIG. 5, each of the strain gauges Re, Rf, Rg, and Rh has a pattern circumferentially extending while being bent in a zigzag manner. Each of the strain gauges Re, Rf, Rg, and Rh has a plurality of resistance lines r2 circumferentially arrayed and substantially parallel to one another. Each of the resistance lines r2 extends in a direction having both radial and circumferential components.

The resistance lines r2 of the strain gauges Re and Rh are inclined to a circumferential one side with respect to the radial direction. The resistance lines r2 of the strain gauges Rf and Rg are inclined to the circumferential other side with respect to the radial direction. The inclination angle of the resistance line r2 with respect to the radial direction is, for example, 45°. The end parts of the resistance lines r2 circumferentially adjacent to each other are alternately connected radially inside or radially outside. Due to this, the plurality of resistance lines r2 are connected in series as a whole.

Figure 6:
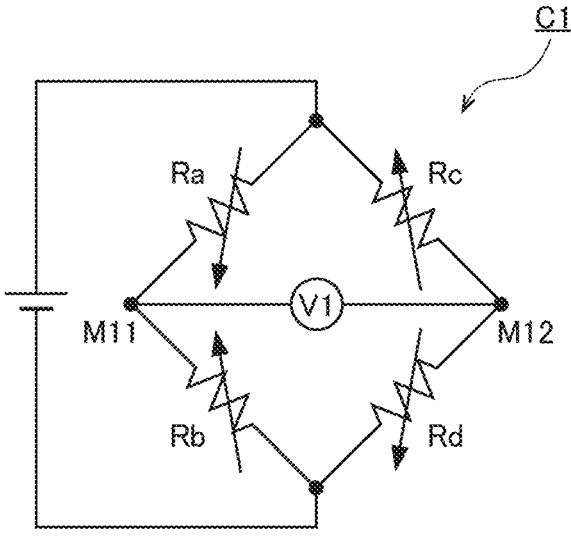
FIG. 6 is a circuit diagram of a first bridge circuit of a first torque sensor according to an example embodiment of the present disclosure.

FIG. 6 is a circuit diagram of a first bridge circuit C1 including the four strain gauges Ra, Rb, Rc, and Rd of the first torque sensor 61. As illustrated in FIG. 6, the four strain gauges Ra, Rb, Rc, and Rd are connected to each other to form the first bridge circuit C1.

The strain gauge Ra and the strain gauge Rb are connected in series in this order. The strain gauge Rc and the strain gauge Rd are connected in series in this order. Between the positive pole and the negative pole of the power supply voltage, the rows of the two strain gauges Ra and Rb and the rows of the two strain gauges Rc and Rd are connected in parallel. A first voltmeter V1 is connected between a midpoint M11 of the two strain gauges Ra and Rb and a midpoint M12 of the two strain gauges Rc and Rd.

The resistance value of each of the resistance lines r1 changes in accordance with the torque applied to the region where the resistance line r1 is disposed. For example, when the diaphragm 33 is applied with torque directed toward a circumferential one side about the central axis 9, the resistance value of each resistance line r1 of the two strain gauges Ra and Rd decreases, and the resistance value of each resistance line r1 of the other two strain gauges Rb and Rc increases. For example, when the diaphragm 33 is applied with torque directed toward the circumferential other side about the central axis 9, the resistance value of each resistance line r1 of the two strain gauges Ra and Rd increases, and the resistance value of each resistance line r1 of the other two strain gauges Rb and Rc decreases. In this manner, the two strain gauges Ra and Rd and the other two strain gauges Rb and Rc exhibit resistance value changes in orientations opposite to each other with respect to the torque.

When the resistance values of the four strain gauges Ra, Rb, Rc, and Rd change, the potential difference between the midpoint M11 of the two strain gauges Ra and Rb and the midpoint M12 of the two strain gauges Rc and Rd changes, and therefore the output value of the first voltmeter V1 also changes. The circuit 52 detects the orientation and magnitude of the torque applied to the diaphragm 33 based on the output value of this first voltmeter V1.

Figure 7:
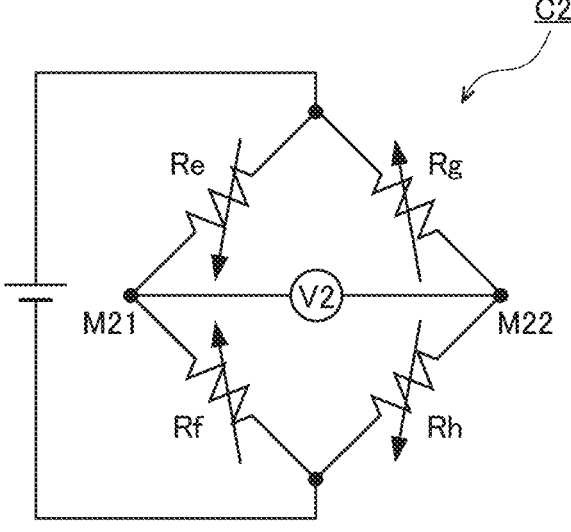
FIG. 7 is a circuit diagram of a second bridge circuit of a second torque sensor according to an example embodiment of the present disclosure.

FIG. 7 is a circuit diagram of a second bridge circuit C2 including the four strain gauges Re, Rf, Rg, and Rh of the second torque sensor 62. As illustrated in FIG. 7, the four strain gauges Re, Rf, Rg, and Rh are connected to each other to form the second bridge circuit C2.

The strain gauge Re and the strain gauge Rf are connected in series in this order. The strain gauge Rg and the strain gauge Rh are connected in series in this order. Between the positive pole and the negative pole of the power supply voltage, the rows of the two strain gauges Re and Rf and the rows of the two strain gauges Rg and Rh are connected in parallel. A second voltmeter V2 is connected between a midpoint M21 between the two strain gauges Re and Rf and a midpoint M22 between the two strain gauges Rg and Rh.

The resistance value of each of the resistance lines r2 changes in accordance with the torque applied to the region where the resistance line r2 is disposed. For example, when the diaphragm 33 is applied with torque directed toward a circumferential one side about the central axis 9, the resistance value of each resistance line r2 of the two strain gauges Re and Rh decreases, and the resistance value of each resistance line r2 of the other two strain gauges Rf and Rg increases. For example, when the diaphragm 33 is applied with torque directed toward the circumferential other side about the central axis 9, the resistance value of each resistance line r2 of the two strain gauges Re and Rh increases, and the resistance value of each resistance line r2 of the other two strain gauges Rf and Rg decreases. In this manner, the two strain gauges Re and Rh and the other two strain gauges Rf and Rg exhibit resistance value changes in orientations opposite to each other with respect to the torque.

When the resistance values of the four strain gauges Re, Rf, Rg, and Rh change, the potential difference between the midpoint M21 of the two strain gauges Re and Rf and the midpoint M22 of the two strain gauges Rg and Rh changes, and therefore the output value of the second voltmeter V2 also changes. The circuit 52 detects the orientation and magnitude of the torque applied to the diaphragm 33 based on the output value of this second voltmeter V2.

The wave reducer 1 of the present example embodiment includes the two torque sensors 61 and 62. The circuit 52 uses any one of the output signals of the two torque sensors 61 and 62 as the output signal of the torque sensor 60. With the two torque sensors 61 and 62, even when an abnormality occurs in any one of the torque sensors, the torque can be detected by the other torque sensor. When an abnormality occurs in any one of the torque sensors, the abnormality can be detected.

The angle sensor 70 is a sensor for detecting the rotation angle of a rotational motion input to the wave reducer 1. That is, the angle sensor 70 is a sensor having an output value that is variable in accordance with the rotation angle of the cam 41. As illustrated in FIG. 5, the angle sensor 70 includes eight strain gauges Ri, Rj, Rk, Rl, Rm, Rn, Ro, and Rp. The eight strain gauges Ri, Rj, Rk, Rl, Rm, Rn, Ro, and Rp are arranged at intervals in the circumferential direction.

Each of the eight strain gauges Ri, Rj, Rk, Rl, Rm, Rn, Ro, and Rp is formed of one conductive wire. Each of the strain gauges Ri, Rj, Rk, Rl, Rm, Rn, Ro, and Rp has a resistance line extending in a circular arc shape along the circumferential direction. However, in each of the strain gauges Ri, Rj, Rk, Rl, Rm, Rn, Ro, and Rp, the resistance line extending in the circumferential direction may be repeatedly arranged in the radial direction. The resistance line of each of the strain gauges Ri, Rj, Rk, Rl, Rm, Rn, Ro, and Rp may extend in the radial direction. In each of the strain gauges Ri, Rj, Rk, Rl, Rm, Rn, Ro, and Rp, the resistance line extending in the radial direction may be repeatedly arranged in the circumferential direction.

Figure 8:
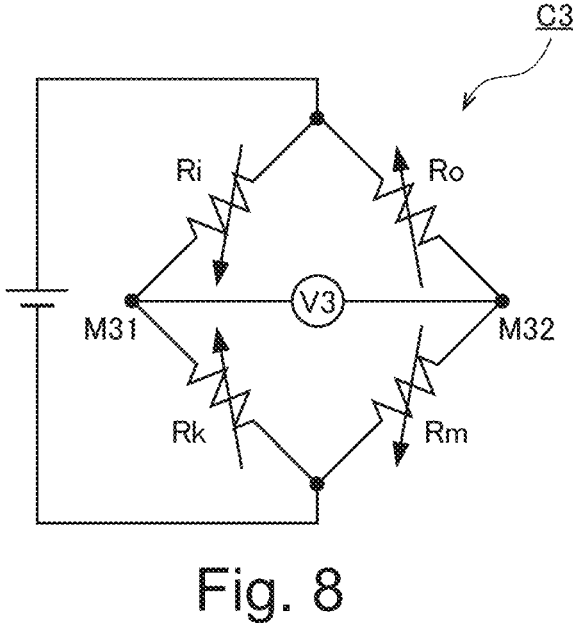
FIG. 8 is a circuit diagram of a third bridge circuit of an angle sensor according to an example embodiment of the present disclosure.

Among the eight strain gauges Ri, Rj, Rk, Rl, Rm, Rn, Ro, and Rp, the four strain gauges Ri, Rk, Rm, and Ro not adjacent to one another are connected to one another to form a third bridge circuit C3. FIG. 8 is a circuit diagram of the third bridge circuit C3. As illustrated in FIG. 8, the strain gauge Ri and the strain gauge Rk are connected in series in this order. The strain gauge Ro and the strain gauge Rm are connected in series in this order. Between the positive pole and the negative pole of the power supply voltage, the rows of the two strain gauges Ri and Rk and the rows of the two strain gauges Ro and Rm are connected in parallel. A third voltmeter V3 is connected between a midpoint M31 between the two strain gauges Ri and Rk and a midpoint M32 between the two strain gauges Ro and Rm.

Figure 9:
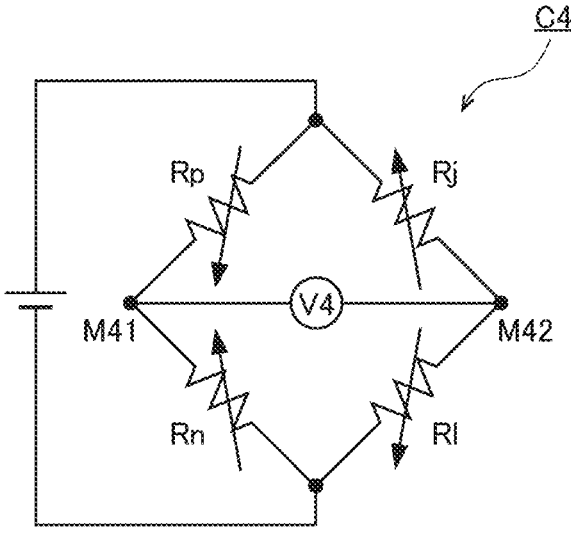
FIG. 9 is a circuit diagram of a fourth bridge circuit of the angle sensor.

Among the eight strain gauges Ri, Rj, Rk, Rl, Rm, Rn, Ro, and Rp, the remaining four strain gauges Rj, Rl, Rn, and Rp are connected to one another to form a fourth bridge circuit C4. FIG. 9 is a circuit diagram of the fourth bridge circuit C4. As illustrated in FIG. 9, the strain gauge Rp and the strain gauge Rn are connected in series in this order. The strain gauge Rj and the strain gauge Rl are connected in series in this order. Between the positive pole and the negative pole of the power supply voltage, the rows of the two strain gauges Rp and Rn and the rows of the two strain gauges Rj and Rl are connected in parallel. A fourth voltmeter V4 is connected between a midpoint M41 of the two strain gauges Rp and Rn and a midpoint M42 of the two strain gauges Rj and Rl.

When the wave reducer 1 is driven, a circumferentially extending part (hereinafter called an "extension part") and a circumferentially contracting part (hereinafter called a "contraction part") are generated in the diaphragm 33 of the flex gear 30. Specifically, two extension parts and two contraction parts are alternately generated in the circumferential direction. That is, the extension part and the part are alternately generated at intervals of 90° in the circumferential direction about the central axis 9. Then, a location where the extension part and the contraction part are generated rotates at the first rotational speed described above.

The resistance value of each of the eight strain gauges Ri, Rj, Rk, Rl, Rm, Rn, Ro, and Rp changes in accordance with circumferential extension and contraction of the diaphragm 33. For example, when the extension part described above overlaps a certain strain gauge, the resistance value of the strain gauge increases. When the contraction part described above overlaps a certain strain gauge, the resistance value of the strain gauge decreases.

In the example of FIG. 5, when the contraction part overlaps the strain gauges Ri and Rm, the extension part overlaps the strain gauges Rk and Ro. When the extension part overlaps the strain gauges Ri and Rm, the contraction part overlaps the strain gauges Rk and Ro. Therefore, in the third bridge circuit C3, the strain gauges Ri and Rm and the strain gauges Rk and Ro exhibit resistance value changes in opposite orientations.

In the example of FIG. 5, when the contraction part overlaps the strain gauges Rp and Rl, the extension part overlaps the strain gauges Rn and Rj. When the extension part overlaps the strain gauges Rp and Rl, the contraction part overlaps the strain gauges Rn and Rj. Therefore, in the fourth bridge circuit C4, the strain gauges Rp and Rl and the strain gauges Rn and Rj exhibit resistance value changes in opposite orientations.

As described above, the angle sensor 70 includes the two sets of bridge circuits C3 and C4 including the plurality of strain gauges Ri, Rj, Rk, Rl, Rm, Rn, Ro, and Rp.

Figure 10:
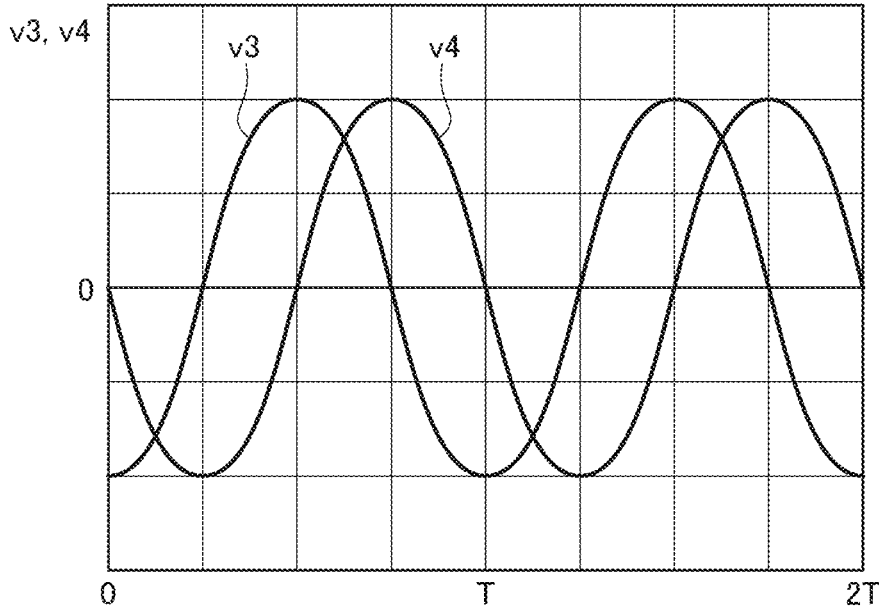
FIG. 10 is a graph showing temporal changes of an output value of a third voltmeter of the third bridge circuit and an output value of a fourth voltmeter of the fourth bridge circuit.

FIG. 10 is a graph showing temporal changes of an output value v3 of the third voltmeter V3 of the third bridge circuit C3 and an output value v4 of the fourth voltmeter V4 of the fourth bridge circuit C4. The horizontal axis of the graph of FIG. 10 represents time. The vertical axis of the graph of FIG. 10 represents a voltage value. When the wave reducer 1 is driven, the output values v3 and v4 having a sinusoidal shape that periodically change are obtained from the third voltmeter V3 and the fourth voltmeter V4, respectively, as illustrated in FIG. 10. A cycle T of the output values v3 and v4 corresponds to ½ times the cycle of the first rotation speed described above.

The output value v3 of the third voltmeter V3 and the output value v4 of the fourth voltmeter V4 have a phase difference of about ¼ cycle. That is, the output values of the two sets of bridge circuits C3 and C4 have a phase difference of about ¼ cycle. Then, the orientation of the rotary motion that is input can be determined by whether the phase of the output value v4 of the fourth voltmeter V4 is advanced by ⅛ cycles (¼ cycles of the output values v3 and v4) of the first rotation speed or delayed by ⅛ cycles (¼ cycles of the output values v3 and v4) of the first rotation speed with respect to the phase of the output value v3 of the third voltmeter V3.

The circuit 52 detects the rotation angle of the rotational motion input to the wave reducer 1 based on the output value v3 of the third voltmeter V3 and the output value v4 of the fourth voltmeter V4. Specifically, the circuit 52 stores a function table in which a combination of the output value v3 of the third voltmeter V3 and the output value v4 of the fourth voltmeter V4 is associated with the rotation angle. The circuit 52 outputs the rotation angle by inputting the output values v3 and v4 to the function table.

When the wave reducer 1 is driven, cyclic flexural deformation occurs in the flex gear 30. Therefore, the output signal of the first torque sensor 61 and the output signal of the second torque sensor 62 described above include a component reflecting the torque originally desired to be measured and an error component (ripple error) caused by the periodic flexural deformation of the flex gear 30. The ripple error changes in a sinusoidal shape in accordance with the rotation angle of the rotational motion input to the wave reducer 1.

Then, the circuit 52 calculates the above-described ripple error in accordance with the rotation angle detected by the angle sensor 70. Thereafter, the output signals of the first torque sensor 61 and the second torque sensor 62 are corrected using the calculated ripple error. Specifically, the circuit 52 increases or decreases the output signals of the first torque sensor 61 and the second torque sensor 62 in a direction of canceling the ripple error. As a result, the circuit 52 can output, with higher accuracy, the torque applied to the flex gear 30.

Note that the circuit 52 may multiply and combine, with the output signals of the first torque sensor 61 and the second torque sensor 62, the output values v3 and v4 of the third voltmeter V3 and the fourth voltmeter V4, respectively, by a predetermined coefficient without calculating the rotation angle described above. This reduces processing load on calculation of the rotation angle. Therefore, the calculation speed of the circuit 52 can be improved.

The thrust sensor 80 is a sensor for detecting a thrust force applied to the cam 41. That is, the thrust sensor 80 is a sensor having an output value that is variable in accordance with the thrust force applied to the cam 41. The thrust force is a force in the axial direction. As illustrated in FIG. 5, the thrust sensor 80 includes two outer strain gauges Rq and Rr and two inner strain gauges Rs and Rt. The two inner strain gauges Rs and Rt are disposed more radially inward than the two outer strain gauges Rq and Rr.

In the present example embodiment, the two outer strain gauges Rq and Rr are disposed radially outside the torque sensor 60. The two outer strain gauges Rq and Rr are arranged at intervals in the circumferential direction. The two outer strain gauges Rq and Rr are each provided in a semicircular arc shape in a range of about 180° centered on the central axis 9. The radial distance from the central axis 9 to the outer strain gauge Rq and the radial distance from the central axis 9 to the outer strain gauge Rr are substantially the same.

In the present example embodiment, the two inner strain gauges Rs and Rt are disposed radially inside the torque sensor 60. The two inner strain gauges Rs and Rt are arranged at intervals in the circumferential direction. The two inner strain gauges Rs and Rt are each provided in a semicircular arc shape in a range of about 180° centered on the central axis 9. The radial distance from the central axis 9 to the inner strain gauge Rs and the radial distance from the central axis 9 to the inner strain gauge Rt are substantially the same.

That is, the two outer strain gauges Rq and Rr and the two inner strain gauges Rs and Rt are arranged at intervals in the radial direction.

As illustrated in FIG. 5, each of the outer strain gauges Rq and Rr and the inner strain gauges Rs and Rt has a pattern circumferentially extending while being bent in a zigzag manner. Each of the strain gauges Rq, Rr, Rs, and Rt has a plurality of resistance lines r3 circumferentially arrayed and substantially parallel to one another. The resistance line r3 each extend in the radial direction about the central axis 9 of the flex gear 30. The end parts of the resistance lines r3 circumferentially adjacent to each other are alternately connected radially inside or radially outside. Due to this, the plurality of resistance lines r3 are connected in series as a whole.

Figure 11:
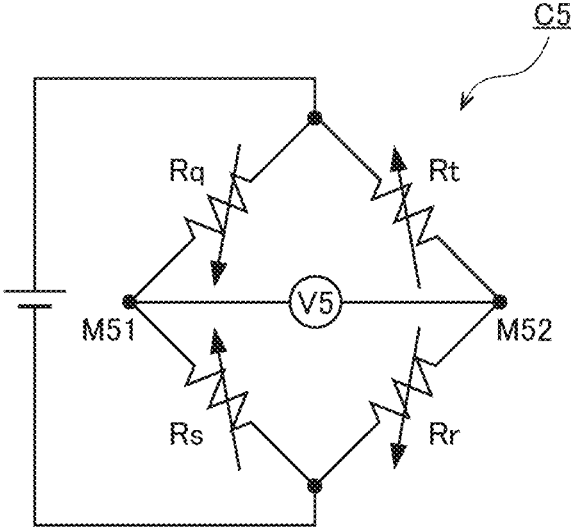
FIG. 11 is a circuit diagram of a fifth bridge circuit of a thrust sensor according to an example embodiment of the present disclosure.

FIG. 11 is a circuit diagram of a fifth bridge circuit C5 including the outer strain gauges Rq and Rr and the inner strain gauges Rs and Rt of the thrust sensor 80. As illustrated in FIG. 11, the two outer strain gauges Rq and Rr and the two inner strain gauges Rs and Rt are connected to each other to form the fifth bridge circuit C5.

The strain gauge Rq and the strain gauge Rs are connected in series in this order. The strain gauge Rt and the strain gauge Rr are connected in series in this order. Between the positive pole and the negative pole of the power supply voltage, two rows of the strain gauges Rq and Rs and two rows of the strain gauges Rt and Rr are connected in parallel. A fifth voltmeter V5 is connected between a midpoint M51 of the two strain gauges Rq and Rs and a midpoint M52 of the two strain gauges Rt and Rr.

All of the plurality of resistance lines r3 included in the four strain gauges Rq, Rr, Rs, and Rt of the thrust sensor 80 extend in the radial direction. For this reason, the change in the resistance value of the strain gauges Rq, Rr, Rs, and Rt due to the circumferential torque is extremely small. However, when the diaphragm 33 of the flex gear 30 is displaced in the axial direction, the resistance values of the strain gauges Rq, Rr, Rs, and Rt change.

Specifically, when the radial inner end part of the diaphragm 33 is displaced in a direction getting close to the internal gear 20, of the four strain gauges Rq, Rr, Rs, and Rt, the resistance values of the two outer strain gauges Rq and Rr increase, and the resistance values of the two inner strain gauges Rs and Rt decrease. On the other hand, when the radial inner end part of the diaphragm 33 is displaced in a direction away from the internal gear 20, of the four strain gauges Rq, Rr, Rs, and Rt, the resistance values of the two outer strain gauges Rq and Rr decrease, and the resistance values of the two inner strain gauges Rs and Rt increase. In this manner, the two outer strain gauges Rq and Rr and the two inner strain gauges Rs and Rt exhibit resistance value changes in orientations opposite to each other with respect to the axial displacement of the diaphragm 33.

When the resistance values of the four strain gauges Rq, Rr, Rs, and Rt change, the potential difference between the midpoint M51 of the two strain gauges Rq and Rs and the midpoint M52 of the two strain gauges Rt and Rr changes, and therefore the output value of the fifth voltmeter V5 also changes. The circuit 52 detects the orientation and magnitude of the thrust force applied to the flex gear 30 based on the output value of this fifth voltmeter V5.

As described above, the angle sensor 70 includes the two sets of bridge circuits C3 and C4. The output values v3 and v4 of the bridge circuits C3 and C4 have a sinusoidal shape and have a phase difference of about ¼ cycle from each other. The amplitudes of the output values v3 and v4 are substantially constant. However, when a force acts from the input side of the wave reducer 1 as at the time of acceleration of the motor 103, or when an external force acts from the output side of the wave reducer 1 due to the inertial force of the arm 102 or the like, the amplitudes of the output values v3 and v4 of the two sets of bridge circuits C3 and C4 slightly changes due to the thrust force applied to the cam 41.

Specifically, when the force acts from the input side of the wave reducer 1, the amplitudes of the output values v3 and v4 of the two sets of bridge circuits C3 and C4 slightly decrease. When the force acts from the output side of the wave reducer 1, the amplitudes of the output values v3 and v4 of the two sets of bridge circuits C3 and C4 slightly increase.

Therefore, the circuit 52 corrects the output value of the angle sensor 70 based on the output value of the thrust sensor 80. Specifically, the circuit 52 corrects the output values v3 and v4 of the two sets of bridge circuits C3 and C4, respectively. More specifically, the circuit 52 increases or decreases the output values v3 and v4 of the two sets of bridge circuits C3 and C4 in a direction of canceling the influence of the thrust force. This can suppress the output value of the angle sensor 70 from changing due to the thrust force applied to the cam 41. Therefore, the rotation angle of the cam 41 can be accurately detected by the corrected output values v3 and v4 of the angle sensor 70.

The circuit 52 corrects the output value of the torque sensor 60 based on the output values v3 and v4 of the angle sensor 70 after corrected based on the output value of the thrust sensor 80. Specifically, the circuit 52 calculates the above-described ripple error based on the corrected output values v3 and v4 of the angle sensor 70, and corrects the output value of the torque sensor 60 so as to cancel the ripple error. Due to this, the torque applied to the flex gear 30 can be detected more accurately.

Next, a method of correcting the output value of the angle sensor 70 caused by the thrust force without using the output value of the thrust sensor 80 will be described.

The output values v3 and v4 of the two sets of bridge circuits C3 and C4 of the angle sensor 70 have a relationship of a sine wave and a cosine wave. Therefore, the sum v3^2+v4^2 of the squares of the output values v3 and v4 is always a constant value in an ideal state. However, when a force acts from the input side or the output side of the wave reducer 1, an error occurs in the amplitudes of the output values v3 and v4 due to the thrust force applied to the cam 41, and therefore the sum v3^2+v4^2 of the squares of the output values v3 and v4 deviates from a constant value.

Therefore, the circuit 52 corrects the output values v3 and v4 of the two sets of bridge circuits C3 and C4 so as to bring the sum v3^2+v4^2 of the squares of the output values v3 and v4 of the two sets of bridge circuits C3 and C4 close to a constant value. For example, the circuit 52 normalizes the output values v3 and v4 so that the sum v4 v3^2+v4^2 of the squares of the output values v3 and v4 is always a constant value. This can suppress the output values v3 and v4 of the bridge circuits C3 and C4 from changing due to the thrust force applied to the cam 41 even when a force acts from the input side or the output side of the wave reducer 1. Therefore, the rotation angle of the cam 41 can be accurately detected by the corrected output values v3 and v4 of the angle sensor 70.

The circuit 52 corrects the output value of the torque sensor 60 based on the output values v3 and v4 of the angle sensor 70 after corrected based on the normalization described above. Specifically, the circuit 52 calculates the above-described ripple error based on the corrected output values v3 and v4 of the angle sensor 70, and corrects the output value of the torque sensor 60 so as to cancel the ripple error. Due to this, the torque applied to the flex gear 30 can be detected more accurately.

The circuit 52 may output the correction amounts of the output values v3 and v4 by the normalization as a detection value representing the thrust force applied to the cam 41.

The circuit 52 may output an alert signal when the sum of the squares of the output values v3 and v4 of the two sets of bridge circuits C3 and C4 is out of a predetermined range. The alert signal is a signal indicating that there is a possibility that at least one of the output values v3 and v4 of the angle sensor 70 is not normal. This enables a control unit or the user of the industrial machine 100 to recognize that there is a possibility that at least one of the output values v3 and v4 of the angle sensor 70 is not normal based on the alert signal. Therefore, it is possible to stop the operation of the industrial machine 100 and take measures such as inspection of the angle sensor 70.

Although the example embodiments of the present disclosure have been described above, the present disclosure is not limited to the above example embodiments. Hereinafter, various modifications will be described focusing on differences from the example embodiment described above.

In the above example embodiments, the wave reducer 1 includes the circuit 52 for correcting the output value of the angle sensor 70. However, the circuit 52 may be provided outside the wave reducer 1. That is, the wave reducer 1 and the circuit 52 may constitute a drive system.

In this case, the angle sensor 70 and the thrust sensor 80 of the wave reducer 1 may be electrically connected to the circuit 52 provided outside the wave reducer 1, and the circuit 52 may correct the output value of the angle sensor 70 based on the output value of the thrust sensor 80.

Alternatively, the angle sensor 70 of the wave reducer 1 and the circuit 52 provided outside the wave reducer 1 may be electrically connected, and the circuit 52 may correct the output values v3 and v4 of the two sets of bridge circuits C3 and C4 so as to bring the sum v3^2+v4^2 of the squares of the output values v3 and v4 of the two sets of bridge circuits C3 and C4 of the angle sensor 70 close to a constant value.

One circuit 52 may correct the output values of the angle sensors 70 of a plurality of the wave reducers 1.

In the above example embodiment, the torque sensor 60 includes the first torque sensor 61 and the second torque sensor 62. However, the torque sensor 60 may be only any one of the first torque sensor 61 and the second torque sensor 62.

In the above example embodiments, the thrust sensor 80 includes only one set of the fifth bridge circuit C5 including the outer strain gauges Rq and Rr and the inner strain gauges Rs and Rt. However, the thrust sensor 80 may include two sets of the fifth bridge circuits C5 each including the outer strain gauges Rq and Rr and the inner strain gauges Rs and Rt. By doing this, even when an abnormality occurs in any one of the fifth bridge circuits C5, the thrust force can be detected by the other of the fifth bridge circuits C5. When an abnormality occurs in any one of the fifth bridge circuits C5, the abnormality can be detected.

In the wave reducer 1 of the above example embodiments, the flex gear 30 is fixed to the base frame 101, and the internal gear 20 rotates at the second rotational speed after deceleration. However, the internal gear 20 may be fixed to the base frame 101, and the flex gear 30 may rotate at the second rotational speed after deceleration.

The flex gear 30 of the above example embodiment is a so-called "hat type" gear in which the diaphragm 33 expands radially outward from the body 31. However, the flex gear 30 may be a so-called "cup type" gear in which the diaphragm 33 expands radially inward from the body 31.

In the above example embodiments, the industrial machine 100 is an industrial robot having an arm. However, the industrial machine 100 may be another device such as an assist suit or an unmanned transport vehicle.

In addition, detailed configurations of the wave reducer, the industrial machine, and the drive system may be appropriately changed without departing from the gist of the present disclosure. The elements appearing in the above example embodiment and modifications may be appropriately combined as long as no contradiction occurs.

The present technology can have the following configurations.

(1) A wave reducer including: a cam having a non-circular outer surface; a flex gear flexurally deformed by rotation of the cam; an internal gear meshing with the flex gear; an angle sensor located in the flex gear and having an output value that is variable in accordance with a rotation angle of the cam; a thrust sensor located in the flex gear and having an output value that is variable in accordance with a thrust force applied to the cam; and a circuit electrically connected to the angle sensor and the thrust sensor, wherein the circuit corrects an output value of the angle sensor based on an output value of the thrust sensor.

(2) The wave reducer according to (1), wherein the angle sensor includes two sets of bridge circuits including a plurality of strain gauges, output values of the two sets of bridge circuits have a phase difference of about ¼ cycle, and the circuit corrects output values of the two sets of bridge circuits.

(3) The wave reducer according to (1) or (2) further including a torque sensor having an output value that is variable in accordance with torque applied to the flex gear, wherein the circuit corrects an output value of the torque sensor based on an output value of the angle sensor after corrected based on an output value of the thrust sensor.

(4) The wave reducer according to any one of (1) to (3), wherein the thrust sensor includes a bridge circuit including an outer strain gauge having a resistance line extending in a radial direction about a central axis of the flex gear; and an inner strain gauge having a resistance line extending in a radial direction about the central axis of the flex gear and disposed more radially inward than the outer strain gauge.

(5) An industrial machine including the wave reducer according to any one of (1) to (4).

(6) A drive system including a wave reducer and a circuit, wherein the wave reducer includes a cam having a non-circular outer surface, a flex gear flexurally deformed by rotation of the cam, an internal gear meshing with the flex gear, an angle sensor located in the flex gear and having an output value that is variable in accordance with a rotation angle of the cam, and a thrust sensor located in the flex gear and having an output value that is variable in accordance with a thrust force applied to the cam, and the circuit corrects an output value of the angle sensor based on an output value of the thrust sensor.

(7) A correction method of correcting an output value of an angle sensor in a wave reducer including a cam having a non-circular outer surface, a flex gear flexurally deformed by rotation of the cam, an internal gear meshing with the flex gear, the angle sensor located in the flex gear, the angle sensor having an output value that is variable in accordance with a rotation angle of the cam, and a thrust sensor located in the flex gear and having an output value that is variable in accordance with a thrust force applied to the cam, the correction method including correcting the output value of the angle sensor based on an output value of the thrust sensor.

(8) A wave reducer including: a cam having a non-circular outer surface; a flex gear flexurally deformed by rotation of the cam; an internal gear meshing with the flex gear; an angle sensor located in the flex gear and having an output value that is variable in accordance with a rotation angle of the cam; and a circuit electrically connected to the angle sensor, wherein the angle sensor includes two sets of bridge circuits including a plurality of strain gauges, output values of the two sets of bridge circuits have a phase difference of about ¼ cycle, and the circuit corrects output values of the two sets of bridge circuits so as to bring a sum of squares of the output values of the two sets of bridge circuits close to a constant value.

(9) The wave reducer according to (8), wherein the circuit outputs a correction amount of an output value of the bridge circuit as a detection value representing a thrust force applied to the cam.

(10) The wave reducer according to (8) or (9), wherein the circuit outputs an alert signal when a sum of squares of output values of the two sets of bridge circuits is out of a predetermined range.

(11) A drive system including a wave reducer and a circuit, wherein the wave reducer includes a cam having a non-circular outer surface, a flex gear flexurally deformed by rotation of the cam, an internal gear meshing with the flex gear, and an angle sensor located in the flex gear and having an output value that is variable in accordance with a rotation angle of the cam, and the angle sensor includes two sets of bridge circuits including a plurality of strain gauges, output values of the two sets of bridge circuits have a phase difference of about ¼ cycle, and the circuit corrects output values of the two sets of bridge circuits so as to bring a sum of squares of the output values of the two sets of bridge circuits close to a constant value.

(12) A correction method of correcting an output value of an angle sensor in a wave reducer including a cam having a non-circular outer surface, a flex gear flexurally deformed by rotation of the cam, an internal gear meshing with the flex gear, and an angle sensor located in the flex gear and having an output value that is variable in accordance with a rotation angle of the cam, wherein the angle sensor includes two sets of bridge circuits including a plurality of strain gauges, output values of the two sets of bridge circuits have a phase difference of about ¼ cycle, and the circuit corrects output values of the two sets of bridge circuits so as to bring a sum of squares of the output values of the two sets of bridge circuits close to a constant value.

The present disclosure can be used for, for example, a wave reducer, an industrial machine, a drive system, and a correction method.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A wave reducer comprising:
a cam including a non-circular outer surface;
a flex gear flexurally deformable by rotation of the cam;
an internal gear meshing with the flex gear;
an angle sensor located in the flex gear and having an output value that is variable in accordance with a rotation angle of the cam;
a thrust sensor located in the flex gear and having an output value that is variable in accordance with a thrust force applied to the cam; and
a circuit electrically connected to the angle sensor and the thrust sensor; wherein
the circuit is operable to correct an output value of the angle sensor based on an output value of the thrust sensor.

2. The wave reducer according to claim 1, wherein the angle sensor includes:
two sets of bridge circuits including a plurality of strain gauges;
output values of the two sets of bridge circuits have a phase difference of about ¼ cycle; and
the circuit is operable correct output values of the two sets of bridge circuits.

3. The wave reducer according to claim 1, further comprising:
a torque sensor having an output value that is variable in accordance with torque applied to the flex gear; wherein
the circuit is operable to correct an output value of the torque sensor based on an output value of the angle sensor after corrected based on an output value of the thrust sensor.

4. The wave reducer according to claim 2, further comprising:
a torque sensor having an output value that is variable in accordance with torque applied to the flex gear; wherein
the circuit is operable to correct an output value of the torque sensor based on an output value of the angle sensor after corrected based on an output value of the thrust sensor.

5. The wave reducer according to claim 1, wherein the thrust sensor includes:

a bridge circuit including outer strain gauges including resistance lines extending in a radial direction about a central axis of the flex gear; and inner strain gauges including resistance lines extending in a radial direction about the central axis of the flex gear and located farther radially inward than the outer strain gauges.

6. The wave reducer according to claim 2, wherein the thrust sensor includes:

a bridge circuit including outer strain gauges including resistance lines extending in a radial direction about a central axis of the flex gear; and inner strain gauges including resistance lines extending in a radial direction about the central axis of the flex gear and located farther radially inward than the outer strain gauges.

7. An industrial machine comprising the wave reducer according to claim 1.

8. An industrial machine comprising the wave reducer according to claim 2.

9. A drive system comprising:

a wave reducer; and a circuit; wherein the wave reducer includes:

a cam including a non-circular outer surface;

a flex gear flexurally deformable by rotation of the cam;

an internal gear meshing with the flex gear;

an angle sensor located in the flex gear and having an output value that is variable in accordance with a rotation angle of the cam; and a thrust sensor located in the flex gear and having an output value that is variable in accordance with a thrust force applied to the cam; and the circuit is operable to correct an output value of the angle sensor based on an output value of the thrust sensor.

10. A correction method of correcting an output value of an angle sensor in a wave reducer including a cam including a non-circular outer surface, a flex gear flexurally deformable by rotation of the cam, an internal gear meshing with the flex gear, the angle sensor located in the flex gear, the angle sensor having an output value that is variable in accordance with a rotation angle of the cam, and a thrust sensor located in the flex gear and having an output value that is variable in accordance with a thrust force applied to the cam, the correction method comprising:

correcting the output value of the angle sensor based on an output value of the thrust sensor.

11. A wave reducer comprising:

a cam including a non-circular outer surface;

a flex gear flexurally deformable by rotation of the cam;

an internal gear meshing with the flex gear;

an angle sensor located in the flex gear and having an output value that is variable in accordance with a rotation angle of the cam; and a circuit electrically connected to the angle sensor; wherein the angle sensor includes:

two sets of bridge circuits including a plurality of strain gauges;

output values of the two sets of bridge circuits have a phase difference of about ¼ cycle; and the circuit is operable to correct output values of the two sets of bridge circuits to cause a sum of squares of the output values of the two sets of bridge circuits to be equal or approximately equal to a constant value.

12. The wave reducer according to claim 11, wherein the circuit is operable to output correction amounts of output values of the bridge circuits as a detection value representing a thrust force applied to the cam.

13. The wave reducer according to claim 11, wherein the circuit is operable to output an alert signal when a sum of squares of output values of the two sets of bridge circuits is out of a predetermined range.

14. The wave reducer according to claim 12, wherein the circuit is operable to output an alert signal when a sum of squares of output values of the two sets of bridge circuits is out of a predetermined range.

15. A drive system comprising:

a wave reducer; and a circuit; wherein the wave reducer includes:

a cam including a non-circular outer surface;

a flex gear flexurally deformable by rotation of the cam;

an internal gear meshing with the flex gear; and an angle sensor located in the flex gear and having an output value that is variable in accordance with a rotation angle of the cam; and the angle sensor includes:

two sets of bridge circuits including a plurality of strain gauges;

output values of the two sets of bridge circuits have a phase difference of about ¼ cycle; and the circuit corrects output values of the two sets of bridge circuits to cause a sum of squares of the output values of the two sets of bridge circuits to be equal or approximately equal to a constant value.

16. A correction method of correcting an output value of an angle sensor in a wave reducer including a cam including a non-circular outer surface, a flex gear flexurally deformable by rotation of the cam, an internal gear meshing with the flex gear, and an angle sensor located in the flex gear and having an output value that is variable in accordance with a rotation angle of the cam, and the angle sensor including two sets of bridge circuits including a plurality of strain gauges, output values of the two sets of bridge circuits have a phase difference of about ¼ cycle, and the circuit is operable to correct output values of the two sets of bridge circuits to cause a sum of squares of the output values of the two sets of bridge circuits to be equal or approximately equal to a constant value.

* * * * *